Aug. 4, 1936.　　　M. C. DE WOLFE　　　2,049,641
HIGH LINE WITH DIRECT CONTROL
Filed July 3, 1934
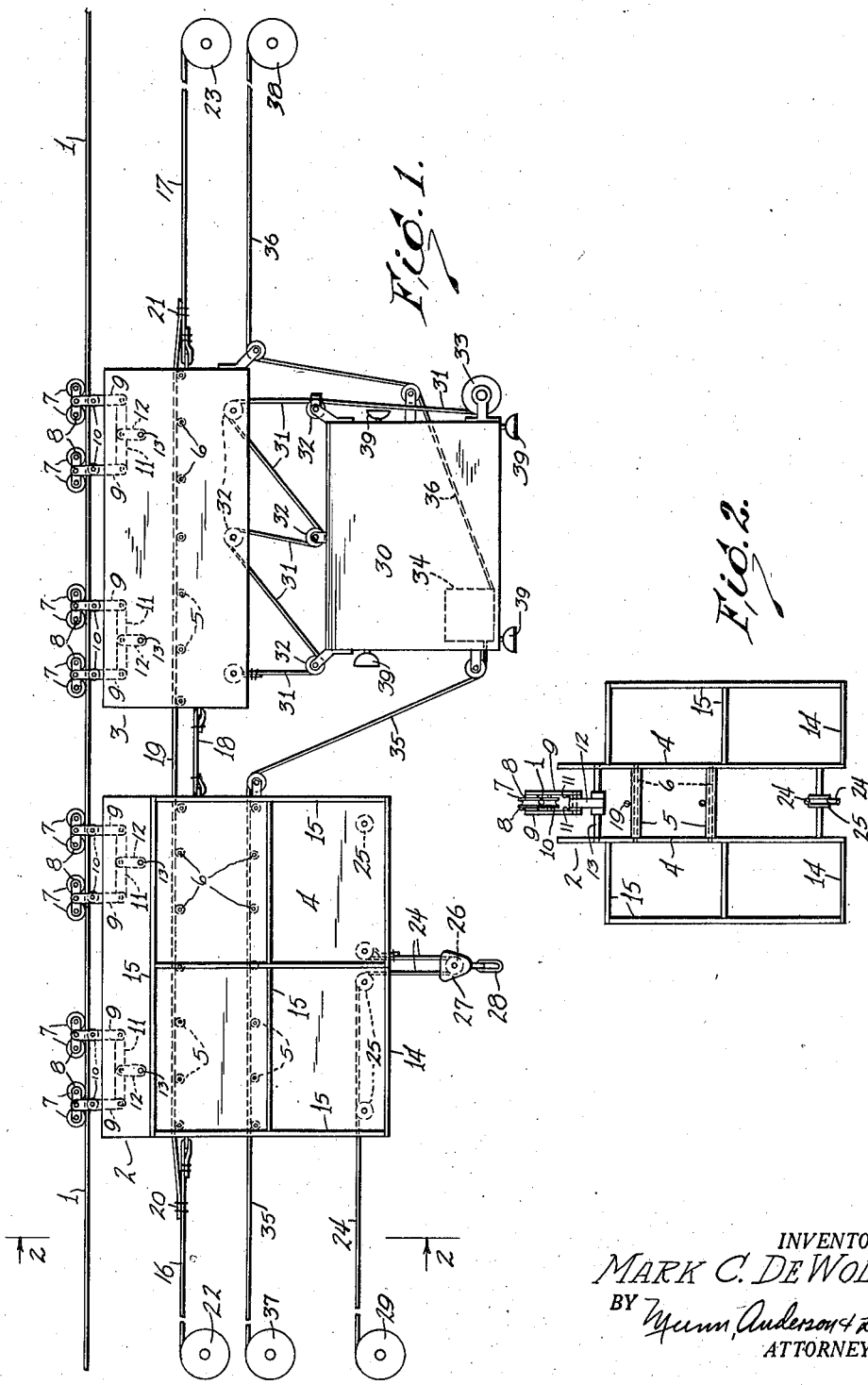
INVENTOR.
MARK C. DE WOLFE
BY Munn, Anderson & Liddy
ATTORNEYS.

Patented Aug. 4, 1936

2,049,641

UNITED STATES PATENT OFFICE 2,049,641

HIGH LINE WITH DIRECT CONTROL

Mark C. De Wolfe, Oakland, Calif.

Application July 3, 1934, Serial No. 733,653

3 Claims. (Cl. 212—94)

My invention relates to improvements in high-lines with direct control, and it consists of the combinations, constructions and arrangements hereinafter described and claimed.

An object of my invention is to provide a high line with a direct control in which a load carriage and a control carriage are linked together and are movably carried by the main line. In-haul and out-haul lines are used for moving the carriages along the main line. The load carriage has a load line leading thereto, and this line movably supports a load carrier. The control carriage supports the control cage and this cage may be directly connected to the carriage so as to be held against vertical movement, or it may be connected to the carriage in such a way that it can be raised or lowered with respect to the control carriage. In this way the operator in the control cage is positioned near the load and can travel with the load so as to have direct and close supervision of it at all times.

Power lines preferably lead to the control cage, and the operator in the cage can actuate the various moving parts and control these parts from his position in the cage.

I provide a safety line connecting the load carriage with the control carriage, and I also provide a safety platform on the load carriage, and repairmen may stand on this platform for making any necessary repairs, and may be protected while doing the work.

Other objects and advantages will appear in the following specification, and the novel features of the device will be particularly pointed out in the appended claims.

My invention is illustrated in the accompanying drawing forming a part of this application, in which Figure 1 is a diagrammatic view of the entire device; and Figure 2 is a section along the line 2—2 of Figure 1.

In carrying out my invention I provide a main line 1 which may be supported by towers not shown, or any other type of support desired. Suspended from the main line are a load carriage 2 and a control carriage 3. Figure 2 shows the load carriage 2 as comprising two side members 4 spaced from each other by sleeves 5 mounted on bolts 6, the bolts in turn holding the sides 4—4 together.

The supporting means for the load carriage and the control carriage is identical for each, and therefore a description of one will suffice.

Sheaves 7 are mounted in pairs and are connected to each other by cross pieces 8. The sheaves 7 ride on the main line, and the cross pieces 8 pivotally carry depending bars 9. A safety sheave 10 is rotatably carried by the depending bars 9, and bears against the under side of the main line for preventing the jumping off of the supporting sheaves 7. I connect the depending bars 9 of adjacent pairs of sheaves together by means of a link 11, and the link in turn carries a central depending link 12, which is connected to the sides 4—4 by a pin 13. It will be seen from this construction that a certain amount of swinging movement is permitted between the load and control carriages and the supporting sheaves 7. I have shown four pairs of supporting sheaves 7 for the load carriage, and a like number of pairs of sheaves for the control carriage. It is obvious that the particular type of support may be changed, without departing from the spirit and scope of the invention.

In order to permit repairmen to fix any part on the load carriage, I provide platforms 14, and these platforms are enclosed by rails 15 so that the workmen can stand on the platforms and be protected by the rails while making the necessary repairs.

In place of the usual endless line for moving the load carriage and the control carriage along the main line, I provide an in-haul line 16 connected to the load carriage, and an out-haul line 17 connected to the control carriage. The two carriages are connected by a flexible link 18. As an additional safety factor I provide a safety line 19 that extends through the two carriages, and has its ends connected at 20 and 21 respectively to the in-haul line 16 and the out-haul line 17.

Any means may be provided for winding in the in-haul line, and for unwinding the out-haul line, for moving the carriages to the left in Figure 1. Also the same means may be used for winding in the out-haul line and unwinding the in-haul line for moving the same carriages to the right. I have indicated a drum 22 for the in-haul line, and a drum 23 for the out-haul line. Motors not shown are connected to the drums for winding in, or paying out, the two lines as needed. The sleeve 5 acts as supports for the safety line 19.

The load carriage has a load line 24 leading thereto, and this line is passed over sheaves 25 in the load carriage, and the line is also passed around a sheave 26 in a load block 27. The load block may carry a link 28 to which the load not shown may be removably secured. A drum 29 is used for winding in or paying out the load line.

A control cage 30 may be fixedly attached to the control carriage so as to have no vertical movement with respect to the carriage. However, I have shown the control cage as being suspended from the control carriage 3 by a cable 31, that is passed over sheaves 32 carried by the carriage and the cage. One end of the cable 31 is connected to the carriage, while the other end is wound around a drum 33. The operator in the cage 30 can wind in or pay out the cable 31 from the drum 33 for raising or lowering the cage with respect to the control carriage. Vertical movement of the control cage permits the operator in the cage to ride with the load block, and at all times be in closed position with respect to the load so as to have complete control over it. The operator is provided with a control box indicated generally at 34 and power lines 35 and 36 lead from the drums 37 and 38 to the control box. The control cage is also provided with lights 39 which are adjustable for permitting the operator to direct light on the load, or to direct the light to other places.

It is customary to provide slack carriers for supporting the different cables. Although I have not shown any carriers in the drawing it is obvious that these can be used if necessity demands.

It is customary on construction work to transport the men from place to place in a cage suspended from the load block 27. Many times men are injured or killed from the cage striking an obstruction which the man in control of the cage cannot see. With the present device the operator is in a control cage which, as already stated, moves vertically with the load block. The workmen can be transported safely in this manner because the operator at all times actually has the cage carrying the workmen in view.

It is also possible to use the device without the load carriage, and the load block. In this instance the in-haul line 16 would be attached directly to the control carriage and the control cage could be used for transporting sight-seers over canyons or the like. The control carriage could be moved over the main line 1, and then the control cage carrying the sight-seers could be raised or lowered into a position where the best view could be obtained.

The power lines 35 and 36 are electrically insulated from the various parts so that persons working around the device will be protected from all electrical disturbance. Also the different units may be grounded electrically to take care of any static electricity.

Although the drawing shows a direct control for the carriages, load block and cage, it is obvious that the device may be remotely controlled as from one of the towers (not shown). The lights 39 carried by the bottom of the cage 30 will be protected in case it is desired to lower the cage until it comes to rest on the ground.

I claim:

1. A high line comprising a main supporting line, a load carriage and a control carriage movable along the line, a flexible link connecting the two carriages together, an in-haul line for moving the carriages in one direction, an out-haul line for moving the carriages in the opposite direction, and a safety line connected to the in-haul and the out-haul line.

2. A high line construction comprising a main supporting line, a load carriage and a control carriage movable therealong, and connected together, an in-haul line connected to the load carriage and to a drum for moving the carriages in one direction, an out-haul line connected to the control carriage and having its other end wrapped around a second drum for moving the carriages in an opposite direction, a control cage, a cable connecting the control cage with the control carriage, a drum for winding up and paying out the cable for moving the control cage vertically with respect to the control carriage, a load line extending from the load carriage, a load block movable vertically by the load line, a third drum for winding up or paying out the load line, a power line extending through the load carriage and terminating at the control cage, a drum for the power line, a second power line extending parallel with the out-haul line, and terminating at the control cage, a drum for the second power line, and a control box for the two power lines, said box being disposed in the control cage.

3. A high line comprising a main supporting cable, a load carriage and a control carriage movable along the cable and connected together, a control cage, a control drum, a control line leading from the drum and operatively connecting the control carriage with the control cage for raising and lowering the cage with respect to the carriage, a load drum unsupported by the main supporting line, a load line leading from the load drum to the load carriage and carrying a load block that can be moved vertically with respect to the load carriage, inhaul and outhaul lines connected to the load and control carriages, drums for the inhaul and outhaul lines unsupported by the main cable, and means in the control cage for controlling the movements of all of the drums.

MARK C. DE WOLFE.